(12) United States Patent
Martin et al.

(10) Patent No.: US 8,872,804 B2
(45) Date of Patent: Oct. 28, 2014

(54) TOUCH SENSING DISPLAY DEVICES AND RELATED METHODS

(75) Inventors: Russel A. Martin, Menlo Park, CA (US); William J. Cummings, Clinton, WA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 473 days.

(21) Appl. No.: 13/187,803

(22) Filed: Jul. 21, 2011

(65) Prior Publication Data

US 2013/0021303 A1    Jan. 24, 2013

(51) Int. Cl.
G06F 3/044 (2006.01)
G06F 3/041 (2006.01)
G06F 3/03 (2006.01)
G06F 1/32 (2006.01)

(52) U.S. Cl.
CPC .............. *G06F 3/0416* (2013.01); *G06F 3/044* (2013.01); *G06F 1/3262* (2013.01)
USPC ............................ 345/178; 345/173; 345/174

(58) Field of Classification Search
USPC .................. 178/18.01; 345/84, 173, 174, 691
See application file for complete search history.

(56) References Cited

U.S. PATENT DOCUMENTS

| | | | |
|---|---|---|---|
| 6,040,937 A | 3/2000 | Miles | |
| 6,674,562 B1 | 1/2004 | Miles et al. | |
| 7,123,216 B1 | 10/2006 | Miles | |
| 7,327,510 B2 | 2/2008 | Cummings et al. | |
| 2006/0012581 A1* | 1/2006 | Haim et al. | 345/173 |
| 2006/0092143 A1 | 5/2006 | Kasai et al. | |
| 2006/0284857 A1 | 12/2006 | Oh | |
| 2007/0205978 A1 | 9/2007 | Zhou et al. | |
| 2007/0290961 A1* | 12/2007 | Sampsell | 345/84 |
| 2008/0122798 A1* | 5/2008 | Koshiyama et al. | 345/173 |
| 2009/0256868 A1 | 10/2009 | Low et al. | |
| 2010/0149130 A1 | 6/2010 | Jung et al. | |
| 2010/0156656 A1 | 6/2010 | Duarte et al. | |
| 2010/0321305 A1 | 12/2010 | Chang et al. | |
| 2011/0061947 A1 | 3/2011 | Krah et al. | |
| 2011/0157058 A1 | 6/2011 | Bita et al. | |

FOREIGN PATENT DOCUMENTS

WO    WO 2008/153216    12/2008

OTHER PUBLICATIONS

Angelé et al. "Invited Paper: Progresses in BiNem display technology for e-reading applications", IMID 2009 Digest, Oct. 2009.
ISR and WO dated Sep. 27, 2012 in PCT/US12/046927.

* cited by examiner

*Primary Examiner* — Dwayne Bost
*Assistant Examiner* — Sepehr Azari
(74) *Attorney, Agent, or Firm* — Knobbe, Martens, Olson & Bear, LLP

(57) ABSTRACT

The present disclosure provides systems, methods, and apparatus relating to touch sensing display devices that include a sensing device and a display device. In one aspect, a touch sensing display device can include adaptive addressing architecture to adjust an addressing characteristic based at least in part in a sensing characteristic of a sensing device. In another aspect, a touch sensing display device can include adaptive sensing architecture to adjust a sensing characteristic of a sensing device based at least in part on an addressing characteristic of a display device and/or on an electrical interference characteristic altered by an addressing circuit of the display device.

31 Claims, 18 Drawing Sheets

Common Voltages

|  | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

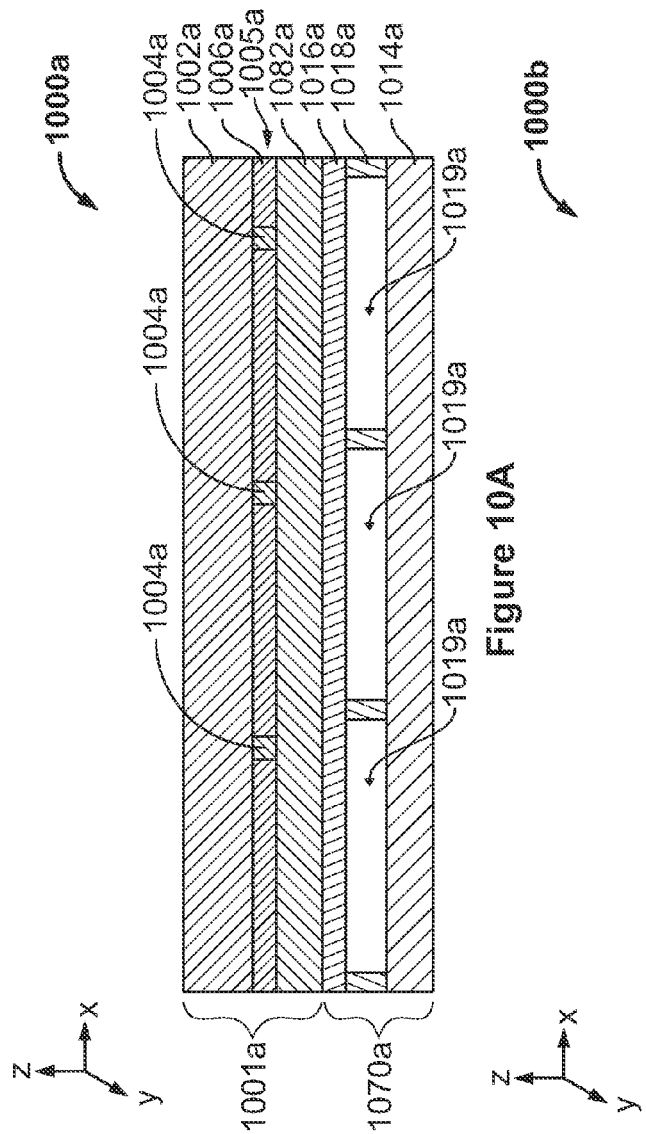
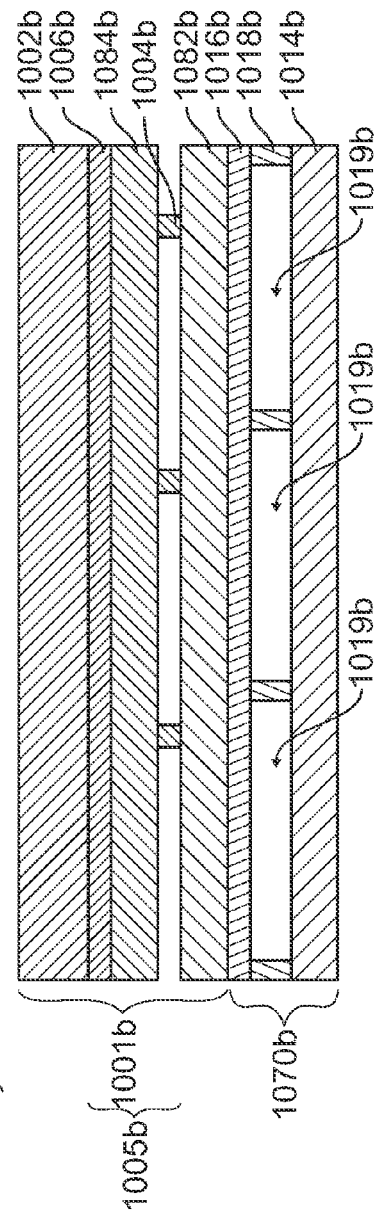

1280b

| Addressing Characteristic Output (1282b) | Sensing Characteristic Output (1284b) |
|---|---|
| 0 | Top Half Scan |
| 1 | Bottom Half Scan |
| 2 | Upper Right Corner Scan |
| 3 | Upper Left Corner Scan |
| 4 | Lower Right Corner Scan |
| 5 | Lower Left Corner Scan |

| Interference Characteristic Output (1283c) | Sensing Characteristic Output (1284c) |
|---|---|
| 0 | 2.5 KHz |
| 1 | 2.2 KHz |
| 2 | 1.9 KHz |
| 3 | 1.6 KHz |
| 4 | 1.3 KHz |
| 5 | 1.0 KHz |

Figure 12C

TOUCH SENSING DISPLAY DEVICES AND RELATED METHODS

TECHNICAL FIELD

This disclosure relates to touch sensing display devices and more specifically to touch sensing display devices that incorporate adaptive sensing architecture and/or adaptive addressing architecture.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Many existing touch sensing devices for touch sensing display devices include electrically isolated conductive rows and columns formed from conductive materials, for example, indium tin oxide (ITO), that are used to detect the location of a conductive object, e.g., a finger, over a sensing device. These sensing devices can be disposed over displays, for example, IMODs, such that the underlying displays are visible through the sensing devices. However, the performance of a sensing device can be affected by electrical interference produced by an associated display device.

SUMMARY

The systems, methods and devices of the disclosure each have several innovative aspects, no single one of which is solely responsible for the desirable attributes disclosed herein.

One innovative aspect of the subject matter described in this disclosure can be implemented in a display device. The display device can include an addressing circuit configured to adjust at least one addressing characteristic of a display and adjusting the at least one addressing characteristic can alter an interference characteristic of the display. The display device can also include a sensing circuit configured to receive information identifying the addressing characteristic or the interference characteristic. The sensing circuit can be configured to adjust at least one sensing characteristic of a touch sensor based at least in part on the received information. In one aspect, the sensing circuit can be configured to sense based on the received information. In one aspect, the addressing circuit can be configured to adjust the at least one addressing characteristic such that the interference characteristic increases and the sensing circuit can be configured to decrease the at least one sensing characteristic. In one aspect, the addressing circuit can be configured to adjust the at least one addressing characteristic such that the interference characteristic decreases and the sensing circuit can be configured to increase the at least one sensing characteristic.

One innovative aspect described in this disclosure can be implemented in a display device. The display device can include means for adjusting at least one addressing characteristic of a display and adjusting the at least one addressing characteristic can alter an interference characteristic of the display. The display device can also include means for adjusting at least one sensing characteristic of a touch sensor based at least in part on information identifying the addressing characteristic or the interference characteristic. In one aspect, the addressing means can be configured to adjust the at least one addressing characteristic such that the interference characteristic increases and the sensing means can be configured to decrease the at least one sensing characteristic. In one aspect, the addressing means can be configured to adjust the at least one addressing characteristic such that the interference characteristic decreases and the sensing means can be configured to increase the at least one sensing characteristic.

Another innovative aspect described in this disclosure can be implemented in a method. The method can include adjusting at least one addressing characteristic of a display such that adjusting the at least one addressing characteristic alters an interference characteristic of the display. The method can also include adjusting at least one sensing characteristic of a touch sensor based at least in part on the addressing characteristic or the interference characteristic and sensing based on the adjusted sensing characteristic. In one aspect, adjusting the at least one addressing characteristic can increase the interference characteristic and the at least one sensing characteristic can be decreased. In one aspect, adjusting the at least one addressing characteristic can decrease the interference characteristic and the at least one sensing characteristic can be increased.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 10A and 10B show cross-sections of two example implementations of touch sensing display devices including sensing devices disposed over display devices.

FIGS. 12B and 12C show examples of lookup tables that may be used in the touch sensing display device of FIG. 12A.

Like reference numbers and designations in the various drawings indicate like elements.

DETAILED DESCRIPTION

Figure 1:
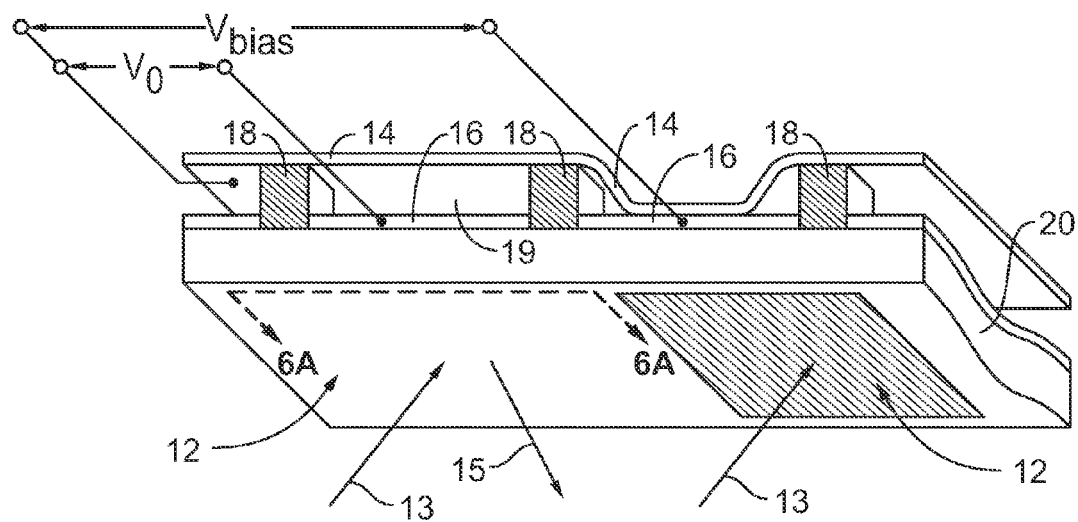
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

In some implementations, a touch sensing display device can include a sensing device disposed over at least a portion of a display device, for example, an interferometric display. A sensing device can be configured to detect a user input in the form of a touch or proximal positioning of a conductive object, for example, a human finger or a stylus. A sensing device can further be configured to detect the location of the user input relative to the sensing device and this detected location can be provided by a sensing circuit to an external circuit, for example, an addressing circuit, that addresses an underlying display. Accordingly, the addressing of the underlying display device can be based, at least in part, on input received by the addressing circuit from the sensing device. For example, in some implementations, a sensing device may detect the touch of a finger or stylus and an addressing circuit may display a cursor element proximal to the detected touch. Further, in implementations of touch sensing display devices that include one or more sensing devices, addressing a display can produce electrical interference that affects the performance of the sensing device.

Various implementations disclosed herein include touch sensing display devices with adaptive sensing architecture and/or adaptive addressing architecture. In some implementations, a touch sensing display device can include an addressing circuit that addresses a display which thereby produces electrical interference. Because the electrical interference can affect the performance of a sensing device, the touch sensing display device can include an adaptive sensing circuit that adjusts at least one sensing characteristic of the sensing device based at least in part on the electrical interference produced by addressing the display. In some implementations, a sensing characteristic that can be adjusted by a sensing circuit can include, for example, signal-to-noise ratio, sensitivity threshold, start/stop times, partial scans, voltage of the input waveform to the sensing circuit, current drive of the sensing waveform, frequency (e.g., a sampling rate), and the type and amount of filtering applied to the received sensing signal. As electrical interference can be related at least partially to an addressing characteristic of a display, in some implementations an adaptive sensing circuit can adjust at least one sensing characteristic of a sensing device based at least in part on an addressing characteristic of an associated display and/or based at least in part on electrical interference produced by the display.

In some implementations, touch sensing display devices can include a sensing circuit that detects a touch input and the sensing circuit can provide this input to an adaptive addressing circuit. The addressing circuit can adjust an addressing characteristic of a display based, at least in part, on the touch input received from the sensing circuit. In some implementations, an addressing characteristic that can be adjusted by an addressing circuit can include, for example, a partial update, update speed, identifying an addressing region, high voltage addressing, low voltage addressing, high segment drive, low segment drive, line inversion, dot inversion, frame inversion, and resolution. In some implementations, touch sensing display devices can include adaptive sensing architecture and adaptive addressing architecture such that an addressing characteristic can be adjusted by a user input, for example a touch, and the adjustment of the addressing characteristic and/or resultant electrical interference can at least partially cause the adjustment of one or more sensing characteristics.

Particular implementations of the subject matter described in this disclosure can be implemented to realize one or more of the following potential advantages. For example, touch sensing display devices disclosed herein can incorporate adaptive addressing architecture to limit power dissipation or consumption of a display and/or to limit electrical interference produced by the display. Reducing electrical interference can improve the performance of an associated sensing device and limiting power dissipation can improve battery life and reduce operating costs. In another example, touch sensing display devices disclosed herein can incorporate adaptive sensing architecture to adjust a sensing characteristic of a sensing device based, at least in part, on an addressing characteristic of a display and/or on electrical interference produced by the display. For example, sensing characteristics may be modified to allow higher resolution and higher speed when using a conductive stylus for applications such as handwriting. Such modification may require lower interference from an associated display panel. Thus, the sensing device can adapt based on how a display is being addressed to improve the performance of the sensing device. Further, reducing the display drive and/or the input signal to the sensing device can reduce the overall amount of electromagnetic interference emitted by the touch sensing display device as a whole.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
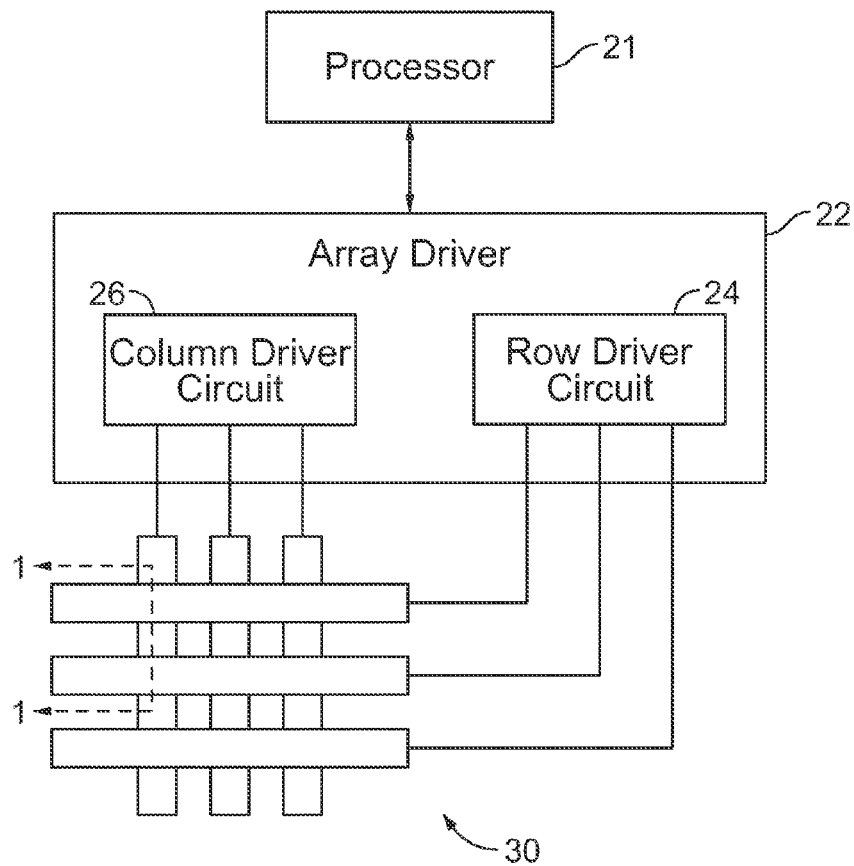
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
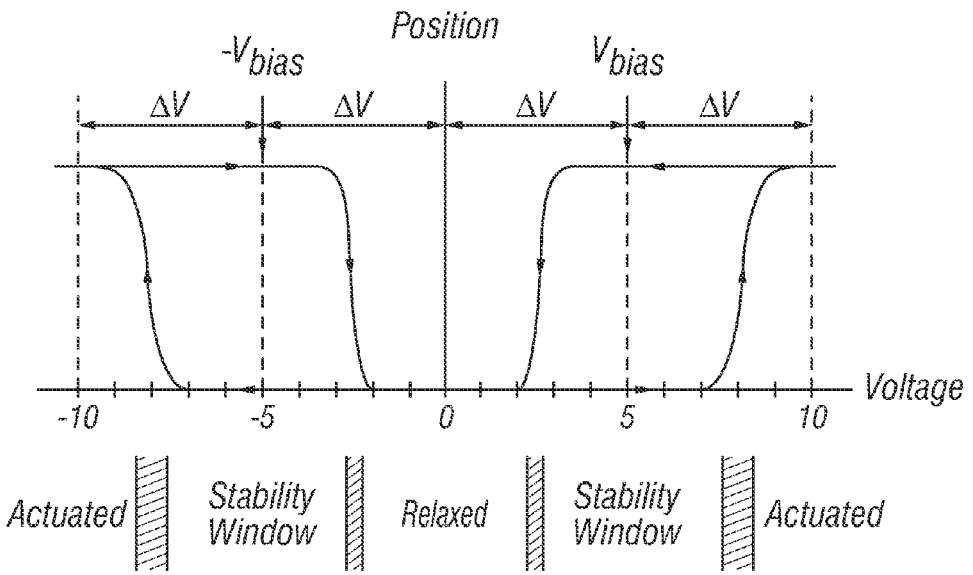
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be addressed, refreshed, and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VD_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VD_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
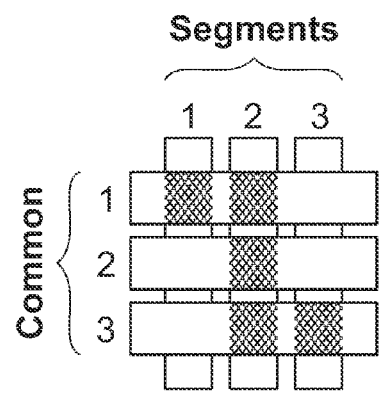
FIG. 5A shows an example of a diagram illustrating a frame of display data in the 3×3 interferometric modulator display of FIG. 2.
Figure 5B:
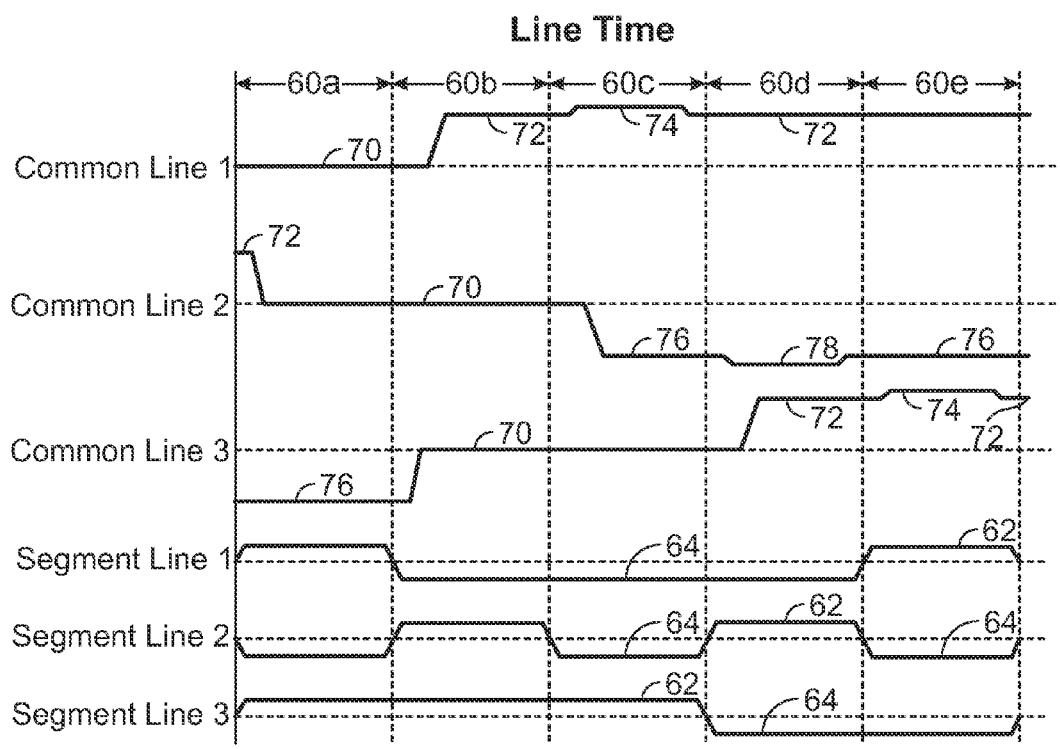
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
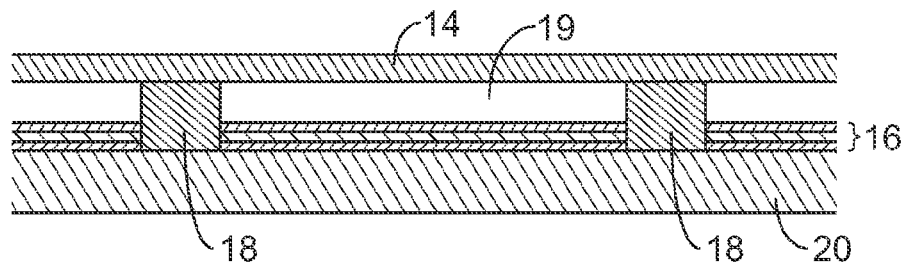
FIG. 6A shows an example of a partial cross-section of the interferometric modulator display of FIG. 1.
Figure 6B:
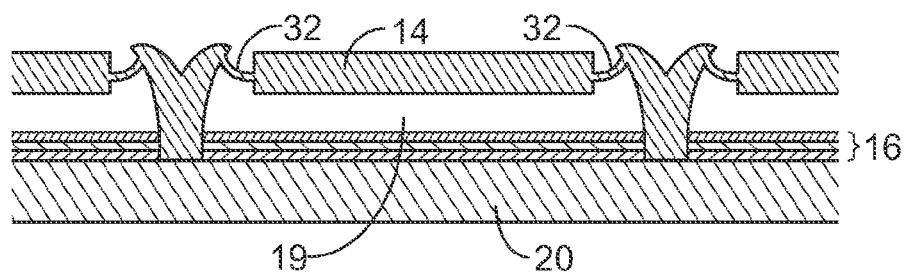
FIGS. 6B-6E show examples of cross-sections of varying implementations of interferometric modulators.
Figure 6C:
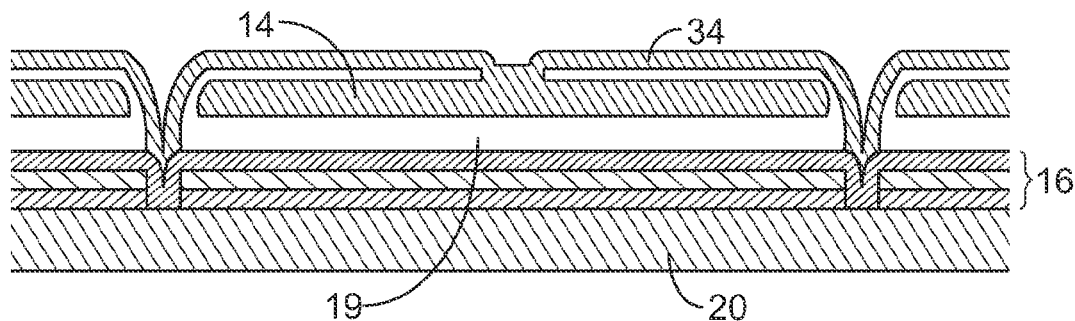

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
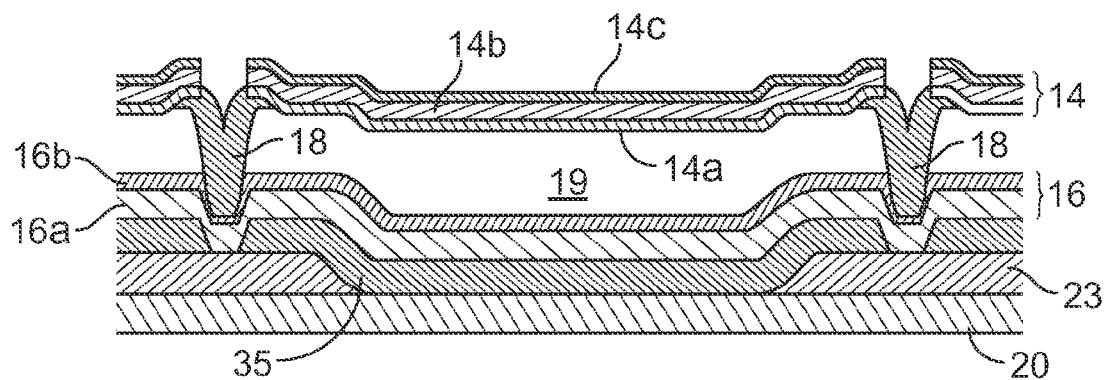

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
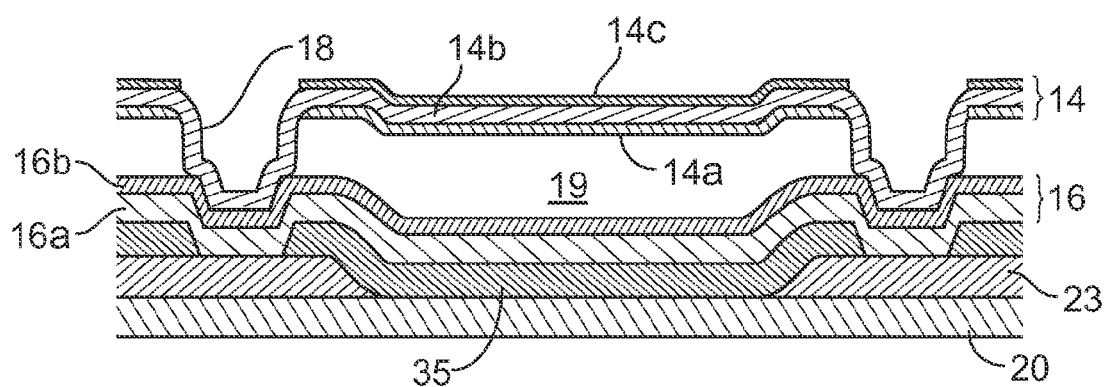

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
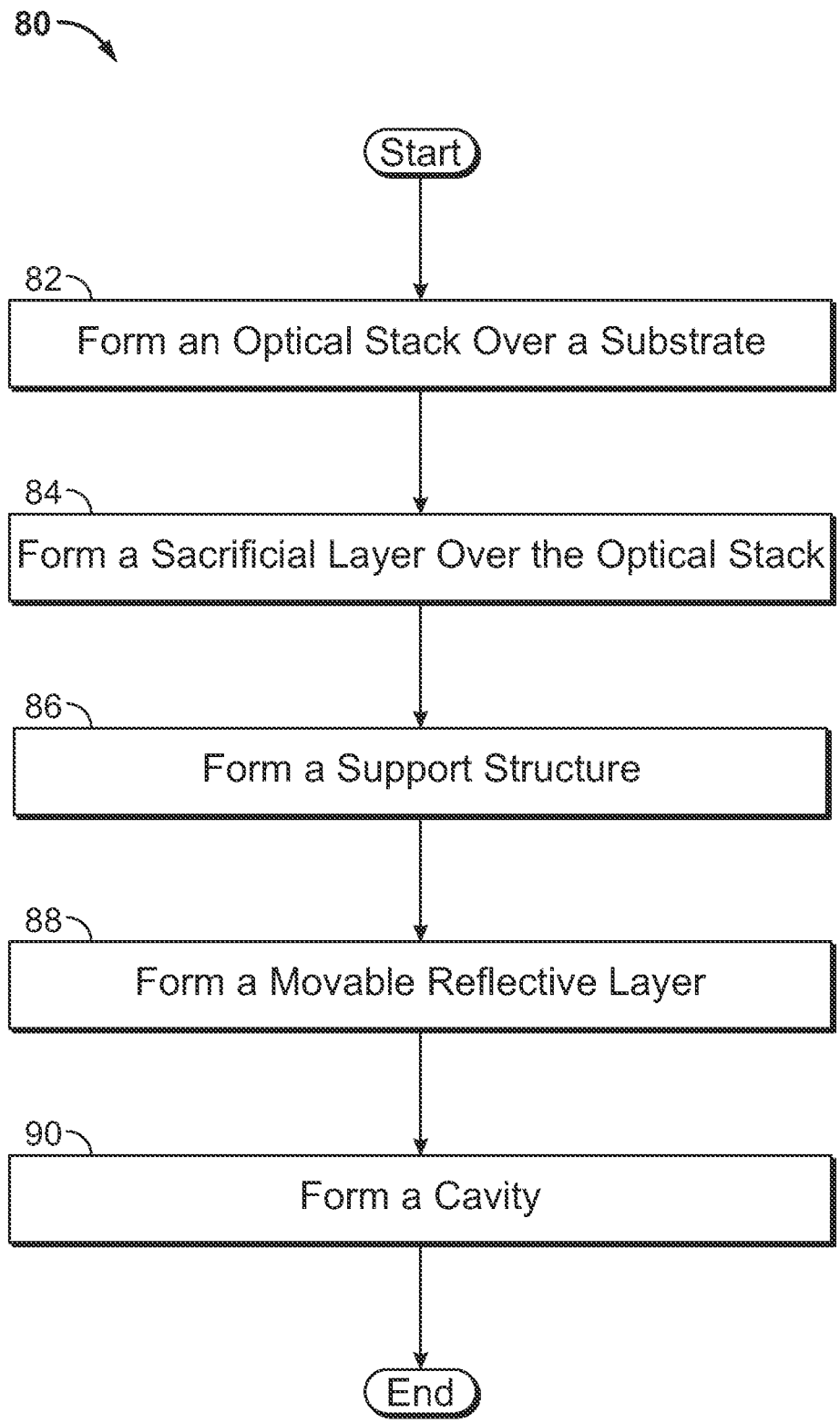
FIG. 7 shows an example of a flow diagram illustrating a manufacturing process for an interferometric modulator.
Figure 8A:
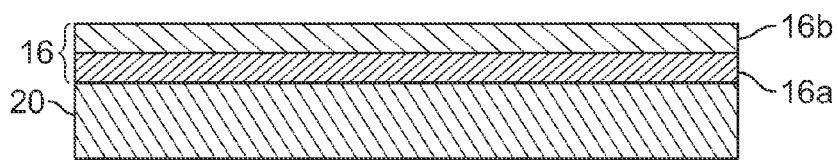
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
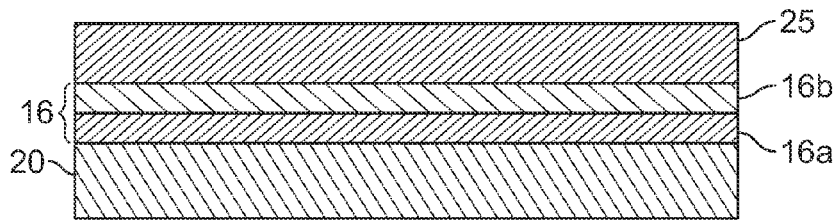

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
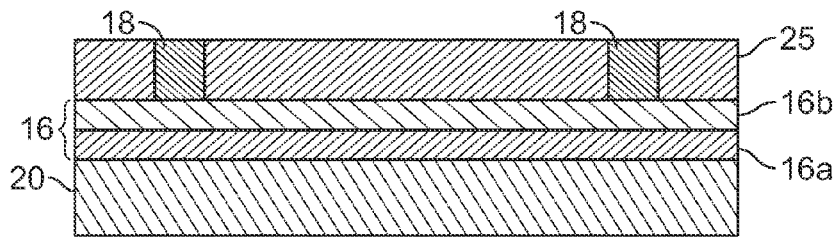

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
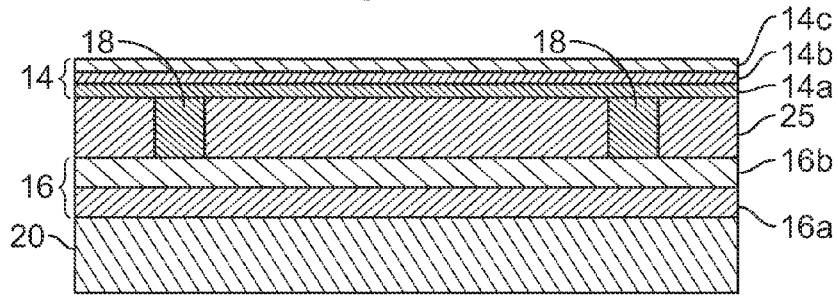
Figure 8E:
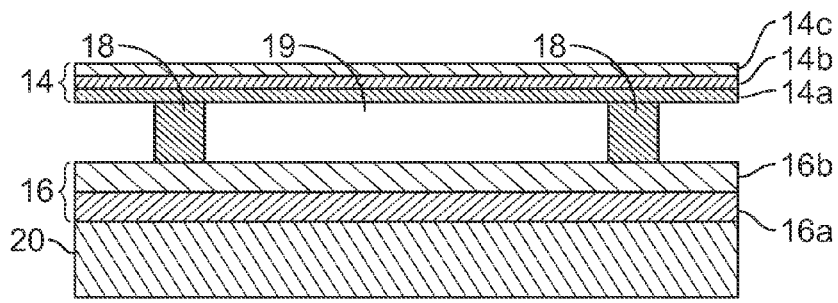

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

As discussed above, touch sensing display devices can include sensing devices that can be disposed over one or more displays, for example, the interferometric modulators described in reference to FIGS. 1-8E. In some implementations, a touch sensing device can be disposed over at least a portion of one or more MEMS devices, interferometric modulator devices, reflective display devices, and/or other display devices. The performance of a touch sensing device can be adversely affected by electrical interference produced by an addressed display that is associated with the sensing device. Additionally, the addressing of a display can be based at least partially on a touch input received by a sensing device. Touch sensing display devices disclosed herein can include adaptive sensing architecture and/or adaptive addressing architecture. As discussed in further detail below, adaptive addressing architecture can limit power dissipation and can limit electrical interference by addressing a display based at least partially on a touch input provided to an addressing circuit by a sensing circuit. Additionally, adaptive sensing architecture can improve sensing performance by sensing based at least partially on an addressing characteristic provided by an addressing circuit to a sensing circuit and/or by sensing based at least partially on an electrical interference characteristic of a display device.

Figure 9A:
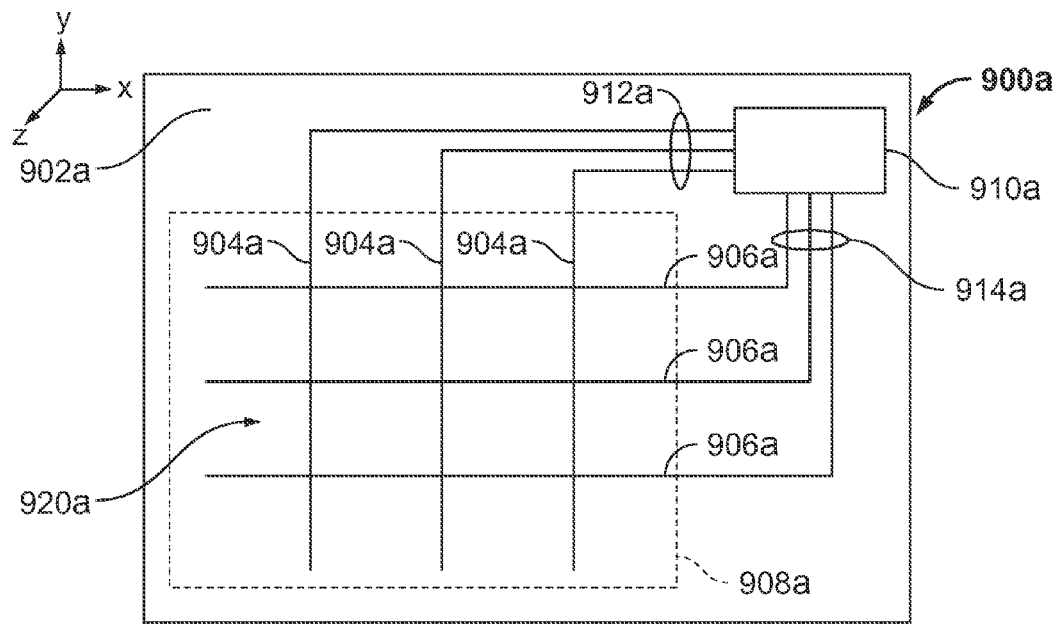
FIG. 9A shows a top-side view of an example sensing device having a plurality of conductive rows and columns for detecting a presence of a conductive object over the sensor array.

FIG. 9A shows a top side view of an example sensing device having a plurality of conductive rows and columns for detecting a presence of a conductive object over the sensor array. Though some of the conductive structures disclosed herein can be referred to as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the conductive structures may be evenly arranged in orthogonal rows and columns (an "array"), or arranged in non-linear configurations, for example, having certain positional offsets with respect to one another (a "mosaic"). Thus, the conductive structures referred to as rows and columns need not be arranged orthogonally to one another, or disposed in an even distribution, in any instance, but may include arrangements having asymmetric shapes and unevenly distributed elements.

The sensing device 900a can be configured to determine the location of a conductive object, for example, a user's finger or a stylus, relative to the sensing device 900a and to provide this location to an external circuit, for example, an addressing circuit, a computer, or other electronic device. In one implementation, the sensing device 900a can be disposed over an underlying reflective display (not shown), for example, an interferometric display. In such an implementation, a viewer can observe at least a portion of the underlying reflective display through a sensor region 908a of the sensing device 900a.

The sensing device 900a can include a substantially transparent cover substrate 902a having a set of conductive rows 906a and a set of conductive columns 904a disposed underneath the cover substrate 902a. Details of the set of conductive rows 906a and the set of conductive columns 906a are not shown in FIG. 9A for clarity. The cover substrate 902a can include an insulating material, for example, glass. The conductive rows and columns 906a, 904a define a sensor array 920a within a sensor region 908a. The conductive rows and columns 906a, 904a are electrically coupled to a sensing circuit 910a by conductive leads 912a, 914a.

In some implementations, the sensing circuit 910a periodically applies a pulse signal to the individual conductive rows and columns 906a, 904a and detects the capacitance between separate conductive rows and columns 906a, 904a and/or between a conductive row or column and an arbitrary earth ground. The sensing circuit 910a can include hardware and/or programmable logic. The capacitance between a conductive row and a conductive column can be referred to as "mutual capacitance" and the capacitance between a conductive row or column and an arbitrary earth ground can be referred to as "self capacitance." Positioning a conductive object near to an overlap between conductive rows and columns 906a, 904a changes the local electrostatic field which reduces the mutual capacitance between conductive rows and columns 906a, 904a. The sensing circuit 910a can detect the presence of a conductive object that is located proximally (e.g., touching or disposed near) to an area of the sensor region 908a by periodically detecting the mutual and/or self capacitances of the conductive rows and columns 906a, 904a and comparing the changes in capacitance from a default condition. Accordingly, other factors that may change the local electrostatic field near one or more rows and columns 906a, 904a, for example, electrical interference produced by another circuit, for example, an underlying display, can affect the sensing performance of the sensing circuit 910a. Based on the patterning of the geometry of the conductive rows and columns 906a, 904a, the location of the conductive object relative to the sensing device 900a can be determined. This sensed location can be provided by the sensing circuit 910a to an external circuit, for example, to an addressing circuit that controls an underlying reflective display. As discussed with reference to FIGS. 11A-11D, an addressing circuit can adjust an addressing characteristic of an underlying display device based at least in part on a sensed location provided to the addressing circuit by a sensing circuit.

Figure 9B:
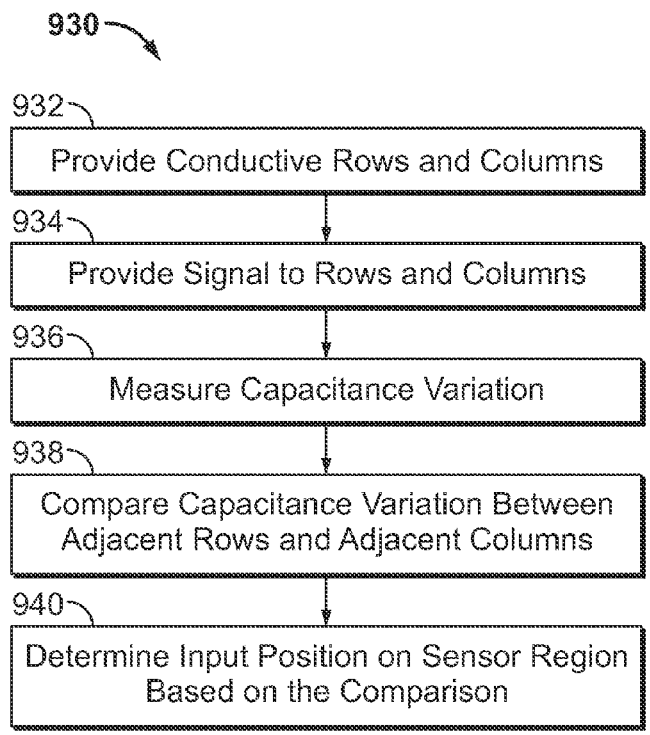
FIG. 9B shows a flow diagram illustrating an example method of operating a sensing device.

FIG. 9B shows a flow diagram illustrating an example method of operating a sensing device. The method 930 can be used to operate various sensing devices, for example, the sensing device 900a of FIG. 9A. As shown at block 932, conductive rows and columns spaced apart from each other can be provided to form a sensor array within a sensor region. As discussed above, the sensor region can be disposed over an underlying display, for example, a reflective display. As shown at block 934, a signal can be provided to each conductive row and column by an external sensing circuit and the capacitance variation of each row and column can measured over time as shown at block 936. The sensing circuit can compare the temporal capacitance variation between adjacent rows and adjacent columns as shown at block 938. Each row can be associated with a coordinate position (e.g., a vertical position) on the sensor region and each column can be associated with another coordinate position (e.g., a horizontal position) on the sensor region such that the compared capacitance variation is used to determine a two-dimensional input position (e.g., a horizontal-vertical coordinate position) of a conductive object over the sensor region as shown at block 940.

Figure 9C:
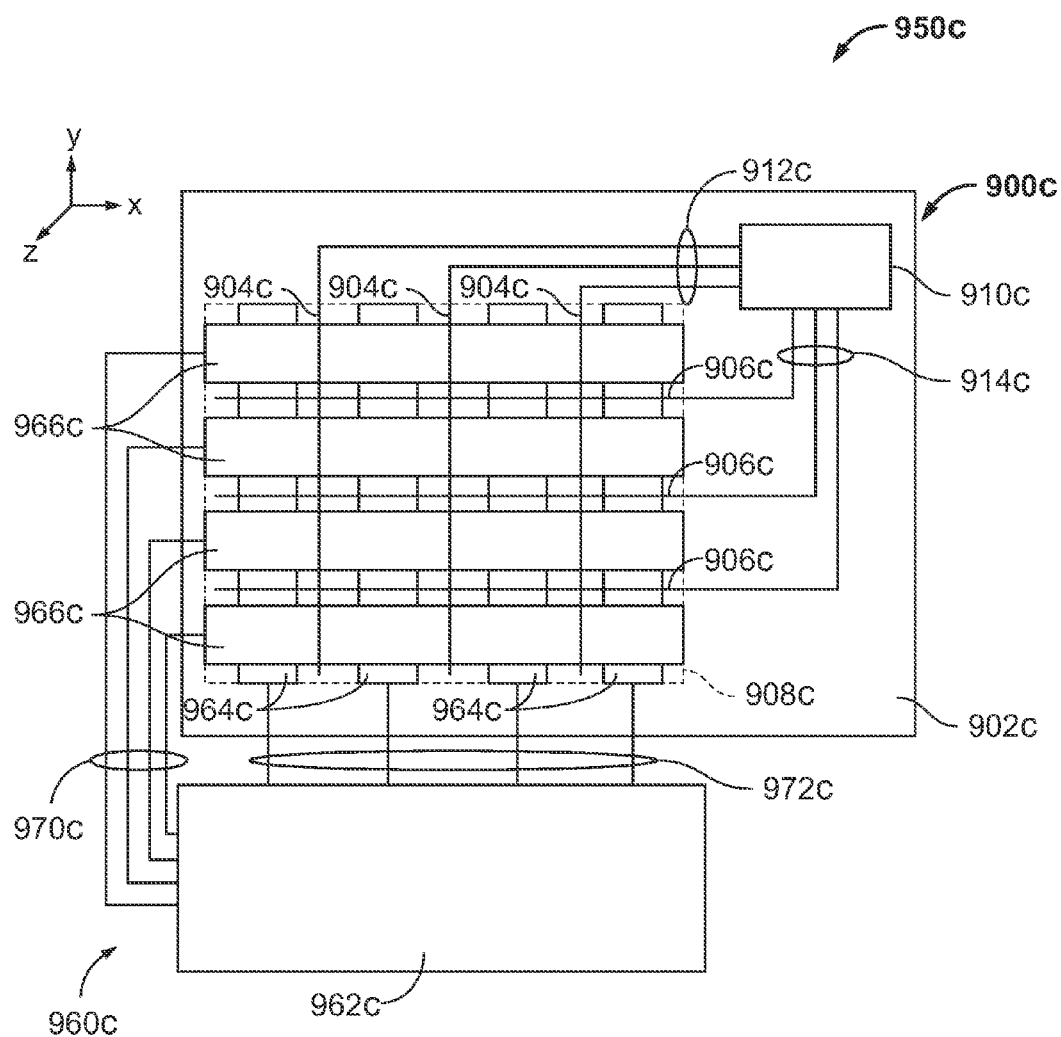
FIG. 9C shows an example of a touch sensing display device.

FIG. 9C shows an example of a touch sensing display device. The touch sensing display device 950c can include a sensing device 900c and a display device 960c disposed underneath at least a portion of the sensing device 900c. The display device 960c can include an interferometric modulator display similar to the display discussed above with reference to FIG. 2. The display device 960c can include an addressing circuit 962c that can be configured to address a plurality of display rows 966c and a plurality of display columns 964c. In some implementations, the addressing circuit 962c can include a row driver circuit that provides signals through conductive leads 970c to the plurality of display rows 966c. In some implementations, the addressing circuit 962c can also include a column driver circuit that provides signals through conductive leads 972c to the plurality of display columns 964c. As discussed above, addressing the plurality of display rows 966c and/or the plurality of display columns 964c can create electrical interference which may affect the performance of the sensing device 900c.

Similar to the sensing device 900a discussed above with reference to FIG. 9A, the sensing device 900c in FIG. 9C can include a substantially transparent cover substrate 902c having a set of conductive rows 906c and a set of conductive columns 904c disposed underneath the cover substrate 902c. The conductive rows and columns 906c, 904c can define a sensor array 920c within a sensor region 908c. The conductive rows and columns 906c, 904c can be electrically coupled to a sensing circuit 910c by conductive leads 912c, 914c.

The sensing circuit 910c can periodically apply a pulse signal to the individual conductive rows and columns 906c, 904c and detect the capacitance between separate conductive rows and columns 906c, 904c and/or between a conductive row or column and an arbitrary earth ground. The pulse signal can be applied to the conductive rows and columns 906c, 904c according to one or more sensing characteristics, for example, signal-to-noise ratio, sensitivity threshold, start/stop times, partial scans, voltage of the input waveform to the sensing circuit, current drive of the sensing waveform, frequency, and the type and amount of filtering applied to the received sensing signal.

Positioning a conductive object near to an overlap between conductive rows and columns 906c, 904c can change the local electrostatic field which can reduce the mutual capacitance between conductive rows and columns 906c, 904c. The sensing circuit 910c can detect the presence of a conductive object that is located proximally (e.g., touching or disposed near) to an area of the sensor region 908c by periodically detecting the mutual and/or self capacitances of the conductive rows and columns 906c, 904c and comparing the changes in capacitance from a default condition. However, electrical interference produced by the underlying display device 960c can affect the sensitivity of the sensing device 900c. Thus, as discussed below with reference to FIGS. 12A-12C, sensing characteristics of the sensing device 900c may be adjusted to account for electrical interference that is produced by the display device 960c when the addressing circuit 962c is addressing the plurality of display rows 966c and the plurality of display columns 964c.

FIGS. 10A and 10B show cross-sections of two example implementations of sensing devices. FIG. 10A shows a cross-section of a display device 1000a including a sensing device 1001a disposed over an underlying interferometric display 1070a. As discussed above, sensing devices can be disposed over other types of displays and/or objects that are not displays. In some implementations, a sensing device can be associated with a display device that is not disposed beneath the sensing device. For example, a sensing device may be associated with a display device that is disposed adjacent to the sensing device.

The sensing device 1001a can include a cover layer 1002a disposed on a first side and an insulating layer 1082a disposed on an opposite side. In some implementations, the cover layer 1002a can be configured to protect components disposed below the cover layer 1002a and can have a thickness that is between 0.02 mm and 1.5 mm. In other implementations, the cover layer 1002a can have a thickness that is less than 20 μm and as thin as about 0.5 μm. In some implementations, the insulating layer 1082a can include any non-conductive material and can be configured to electrically isolate the sensing device 1001a from the underlying interferometric display 1070a.

The sensing device 1001a can also include a conductive row 1006a extending generally parallel to the x-axis (shown as left to right in the figure) and a set of conductive columns 1004a extending generally perpendicular to conductive row 1006a and generally parallel to the y-axis (shown as in and out of the plane of the figure). The conductive columns 1004a and conductive row 1006a can form a sensor array 1005a that can be electrically coupled with one or more sensing circuits (not shown) to form a sensing device as discussed above. Electrical vias through an insulating layer and crossover or cross-under segments (not shown) allow portions of conductive columns 1004a or conductive rows 1006a to be electrically connected to other portions of conductive columns 1004a or conductive rows 1006a, respectively, while avoiding electrical shorting between adjacent or overlapping conductive rows 1006a and conductive columns 1004a.

Still referring to FIG. 10A, the interferometric display 1070a can be disposed underneath the sensor array 1005a such that light incident on the display device 1000a passes through the sensor array 1005a toward the interferometric display 1070a. The interferometric display 1070a can include an absorber layer 1016a (e.g., a partially reflective and partially transmissive layer) and a movable reflector layer 1014a that is offset from the absorber layer 1016a by one or more posts 1018a. One or more optical resonant cavities 1019a can be disposed between the absorber layer 1016a and the movable reflector layer 1014*a*. As discussed above, with respect to the movable reflective layer described with reference to some of the FIGS. 1-8E, the movable reflector layer 1014*a* can be driven between at least two states to change the wavelength of light reflected from the display device 1000*a*. Thus, the interferometric display 1070*a* can be addressed by an addressing circuit by driving the movable reflector layer 1014*a* between a first state and a second state.

FIG. 10B schematically illustrates another implementation of a display device 1000*b* incorporating a sensing device 1001*b* disposed over an underlying interferometric display 1070*b*. In this implementation, the sensor array 1005*b* can include a second insulating layer 1084*b* disposed between a set of conductive rows 1006*b* and a set of conductive columns 1004*b*. The first and second insulating layers 1082*b*, 1084*b* can include any insulating or dielectric material configured to isolate the conductive rows and columns 1006*b*, 1004*b* from one another and from the absorber layer 1016*b*. The first and second insulating layers 1082*b*, 1084*b* can be optically transparent to allow light to pass therethrough without significant absorption. Additionally, the indices of refraction of the first and second insulating layers 1082*b*, 1084*b* can be selected to inhibit reflection of light that passes therethrough. For example, the insulating layers 1082*b*, 1084*b* can be index matched with the materials disposed immediately above or below these layers. Further, in some implementations, optional anti-reflective layers can be disposed above and/or below the insulating layers 1082*b*, 1084*b*. Such anti-reflective layers can be formed of a layer of material that is one-quarter of a wavelength thick at an index of refraction equal to the root of the product of the index of reflection of the material immediately above and below the anti-reflective layer. In some implementations, the insulating layers 1082*b*, 1084*b* and/or the optional anti-reflective layers can have an index of refraction that is in a range from 1.30 to 1.60.

Figure 11A:
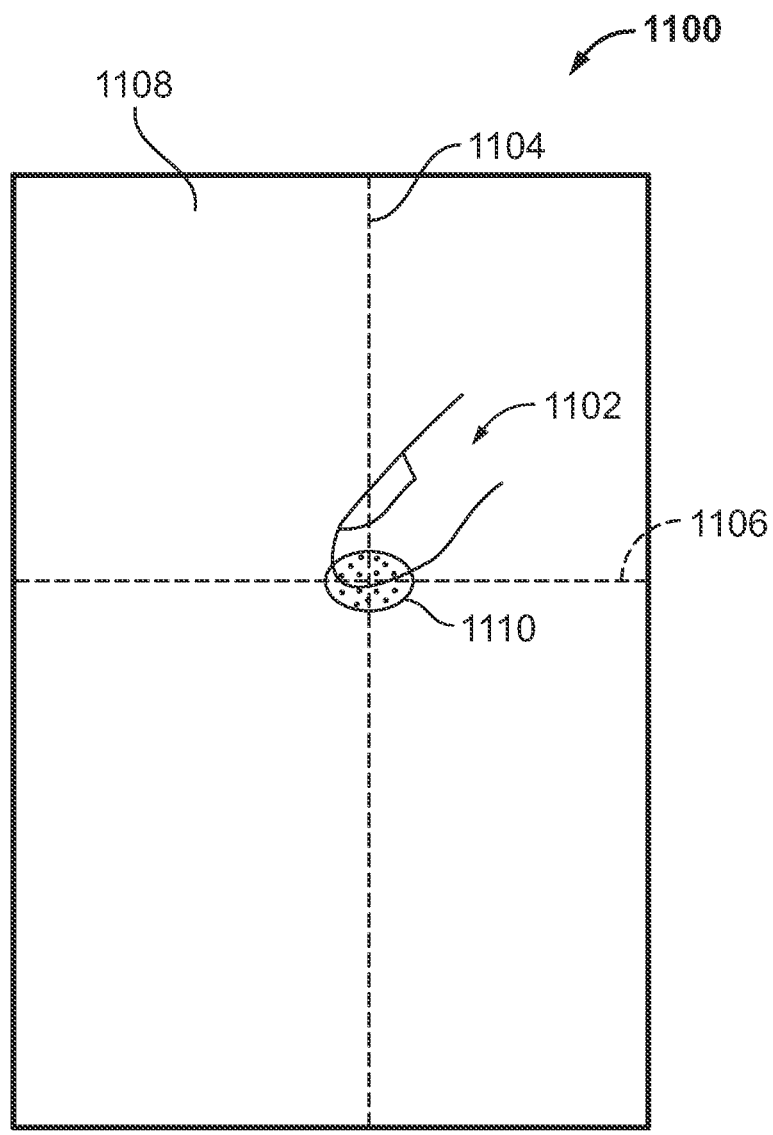
FIGS. 11A-11D show an example of a touch sensing display device having adaptive addressing architecture.
Figure 11B:
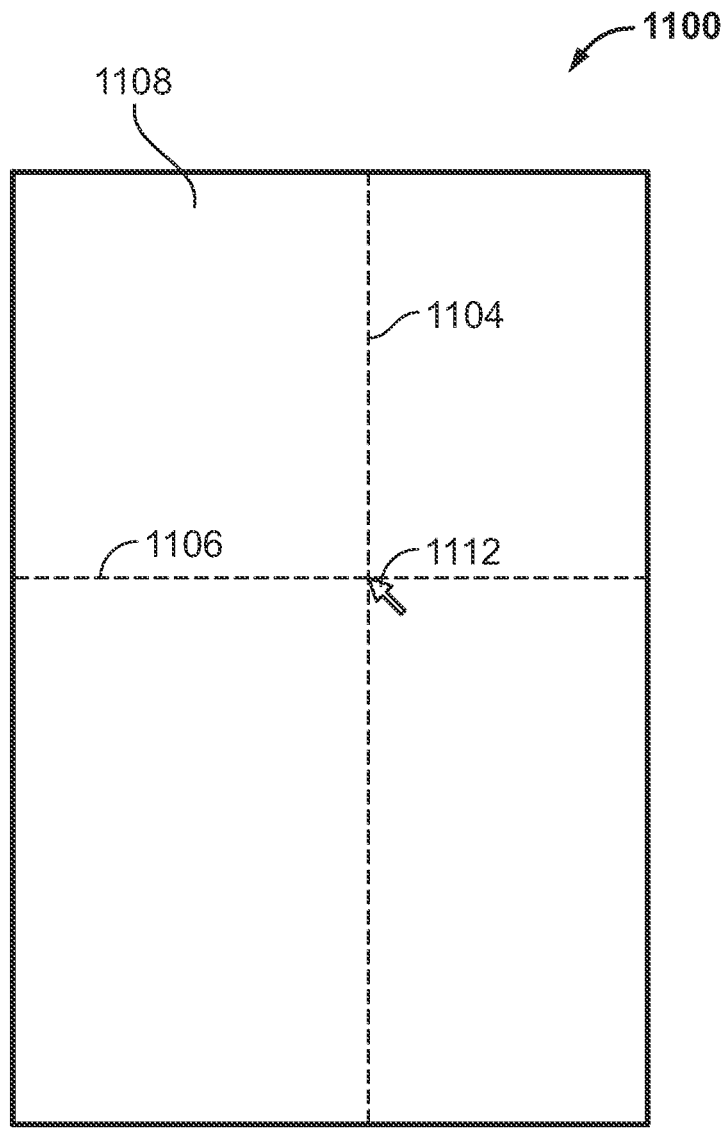

FIGS. 11A-11D show an example of a touch sensing display device including adaptive addressing architecture. The touch sensing display device 1100 can include a sensor region 1108 that can be disposed at least partially over a display device, for example, an interferometric modulator. As shown in FIG. 11A, the touch sensing display device 1100 can be configured to sense an area 1110 of a touch input by a conductive object, for example, a finger 1102. A sensing device included in the touch sensing display device 1100 can include one or more conductive rows 1106 and one or more conductive columns 1104. For clarity sake, FIGS. 11A and 11B illustrate a singular conductive row 1106 and a singular conductive column 1104.

As discussed above with reference to FIGS. 9A and 9C, a sensing circuit can periodically apply a pulse signal to the individual conductive rows and columns 1106, 1104 to detect the capacitance between separate conductive rows and columns 1106, 1104 and/or between a conductive row or column and an arbitrary earth ground. Positioning the finger 1102 near an overlap between a conductive row 1106 and a conductive column 1104 can change the local electrostatic field which reduces the mutual capacitance between conductive row and column 1106, 1104. The sensing circuit can detect the presence of the finger 1102 that is located proximally (e.g., touching or disposed near) to an area 1110 of the sensor region 1108 by periodically detecting the mutual and/or self capacitances of the conductive rows and columns 1106, 1104 and comparing the changes in capacitance from a default condition. In some implementations of touch sensing display devices, a touch input may be used to interact with embedded software. For example, touch input may be used to manipulate a cursor element to navigate through software and/or to display handwritten text and/or to enter handwritten text into a memory.

Turning now to FIG. 11B, the touch sensing display device 1100 is schematically illustrated with a cursor element 1112 displayed underneath the area 1110 of touch input of FIG. 11A. A user may manipulate the cursor element 1112 by varying the location of touch input. For example, a user may touch the sensor region 1108 with finger 1102 such that the cursor element 1112 is displayed underneath the area of touch 1110 and may subsequently move the finger 1102 to a second area of the sensor region 1108 such that the cursor element 1112 is displayed underneath the second area.

In many instances, a cursor element 1112 may be displayed over a static background image, for example, an image of a web page or an image of a word processing document. In implementations of touch sensing display devices that include reflective displays (e.g., interferometric modulators), the devices can have lower power dissipation in hold mode and higher power dissipation when addressing the display (e.g., when refreshing the display). Because the display of a cursor element may require continual addressing to reflect movement of the cursor element, existing touch sensing display devices may address the entire display area when displaying a cursor element resulting in high power dissipation and the production of electrical interference. As discussed below with reference to FIGS. 11C and 11D, implementations of touch sensing devices disclosed herein can incorporate adaptive addressing architecture to limit power dissipation and electrical interference when only a portion of a display is continually addressed.

Figure 11C:
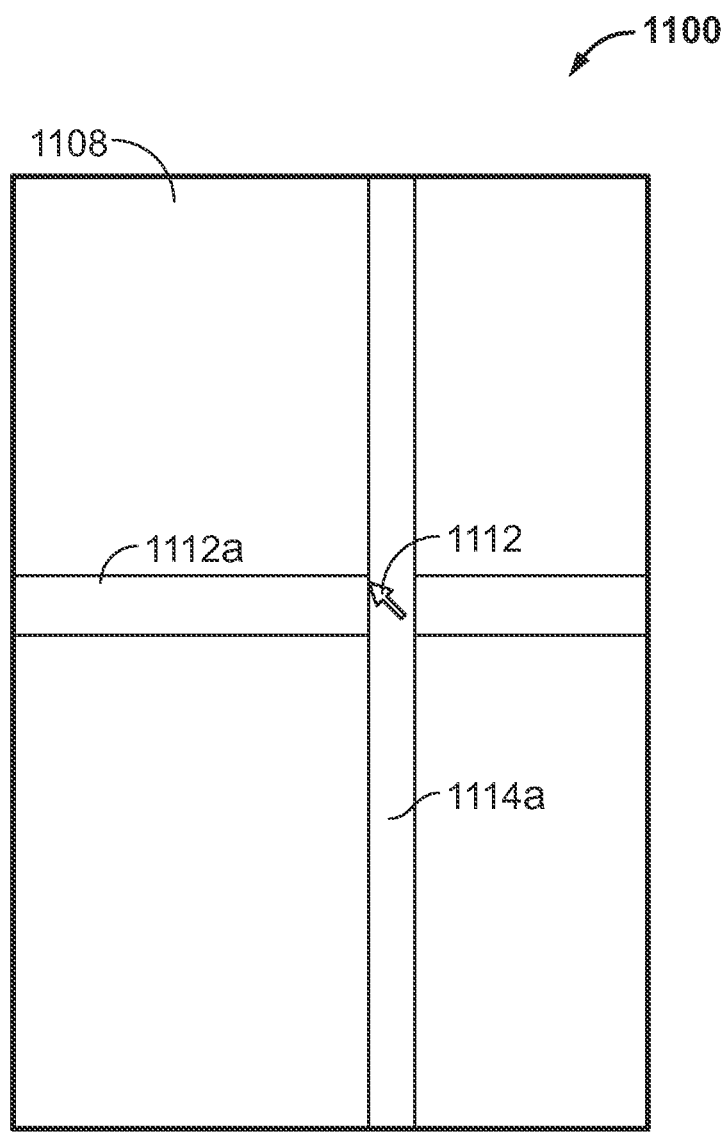

FIG. 11C schematically illustrates a display row 1116*a* and a display column 1114*a* that may be addressed by an addressing circuit of the touch sensing display device 1100 to display the cursor element 1112. The touch sensing display device 1100 can include a plurality of display rows 1116 and a plurality of display columns 1114 such that other portions of the device may be addressed to display an image. However, if portions of the display other than the cursor element 1112 are static, an adaptive addressing circuit can continually address only display row 1116*a* and display column 1114*a* to display the dynamic cursor element 1112 without continually addressing the static portions of the display. Accordingly, incorporating adaptive addressing architecture in a touch sensing display device can limit power dissipation and electrical interference by addressing only a portion of a display in response to a touch input. In some implementations, one or more display rows 1116 adjacent to display row 1116*a* and one or more display columns 1114 adjacent to display column 1114*a* may be continually addressed along with display row 1116*a* and display column 1114*a* to ensure that the cursor element 1112 is continuously displayed even when the touch input deviates slightly from area 1110. In such implementations, power dissipation and electrical interference can be reduced by not addressing other display rows 1116 that are offset from display row 1116*a* and by not addressing display columns 1114 that are offset from display column 1114*a*.

Figure 11D:
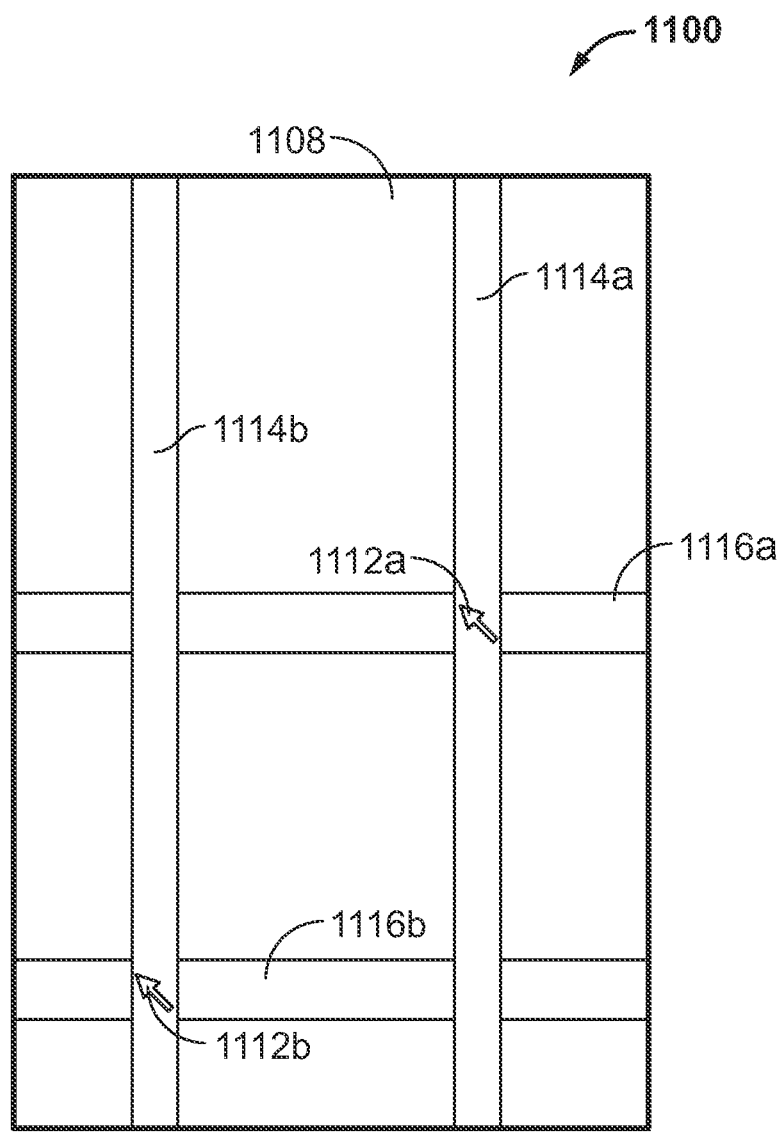

FIG. 11D schematically illustrates the manipulation of the cursor element 1112 of the touch input of FIGS. 11A-11C from a first location to a second location. FIG. 11D includes a first cursor element 1112*a* representing the cursor element 1112 of FIG. 11C in a first location and a second cursor element 1112*b* representing the cursor element 1112 of FIG. 11C in a second location. As shown, the first cursor element 1112*a* can be displayed by addressing a display row 1106*a* and a display column 1104*a*. Similarly, the second cursor element 1112*b* can be displayed by addressing a display row

1116b and a display column 1114b. As the cursor element 1112 moves from the first position to the second position, an adaptive addressing circuit can address only those display rows and columns 1116, 1114 that correspond to the touch input of a user such that other display rows and columns are not addressed. In this way, the adaptive addressing circuit can limit power dissipation and electrical interference. Limiting electrical interference can allow for an increased sensing sensitivity and increase sensing speed. In some implementations, a sensing device may predict a movement path of a cursor element based on the trajectory of earlier movement paths of the cursor element. A touch input path prediction may be provided by a sensing circuit to an adaptive addressing circuit to increase an addressing speed of the touch sensing display device and/or to further limit power dissipation and/or electrical interference.

As discussed above, some implementations of touch sensing display devices disclosed herein can include adaptive addressing architecture to limit power dissipation and/or electrical interference. Further, some implementations of touch sensing display device may include adaptive sensing architecture. Adaptive sensing architecture can include a sensing circuit that adjusts a sensing characteristic of a sensing device based at least in part on an addressing characteristic of an addressing circuit and/or an electrical interference characteristic of an associated display. Thus, adaptive sensing architecture may be implemented to adjust sensing performance as addressing characteristics of a display change. In some implementations, an addressing characteristic can include partial update, update speed, identifying an addressing region, high voltage addressing, low voltage addressing, high segment drive, low segment drive, line inversion, dot inversion, frame inversion, and resolution.

In some implementations, a sensing characteristic can include signal-to-noise ratio, sensitivity threshold, start/stop times, partial scans, voltage of the input waveform to the sensing circuit, current drive of the sensing waveform, frequency, and the type and amount of filtering applied to the received sensing signal. In one example, adjusting an addressing characteristic of a display may increase an electrical interference characteristic of the display and a sensing circuit may decrease a sensing characteristic, for example, sensitivity threshold, based on the increased electrical interference characteristic and/or based on the adjusted addressing characteristic. Accordingly, the performance of the sensing device can be adjusted along with the change in electrical interference that results from a change in addressing characteristic. In another example, adjusting an addressing characteristic of a display may decrease an electrical interference characteristic of the display and a sensing circuit may increase a sensing characteristic based on the decreased electrical interference characteristic and/or based on the adjusted addressing characteristic. In another example, the timing of sensing and the timing of addressing can interfere with one another. In such an example, if the addressing frequency, or one of its harmonics, is close to the sensing frequency, the electrical interference characteristic would increase. To limit and/or lower the electrical interference characteristic, either of the addressing frequency or sensing characteristic may be adjusted. For example, if it is important to adjust the addressing frequency to accommodate a change in a video input rate to the system, then the sensing frequency could be changed. Alternatively, if the amplitude of the addressing waveform is increased to accommodate a change in environmental conditions (e.g., temperature), the electrical interference characteristic could increase. In such an example, a sensing characteristic could be adjusted to require more averaging and/or the sensing circuit could send out a larger voltage pulse.

Figure 12A:
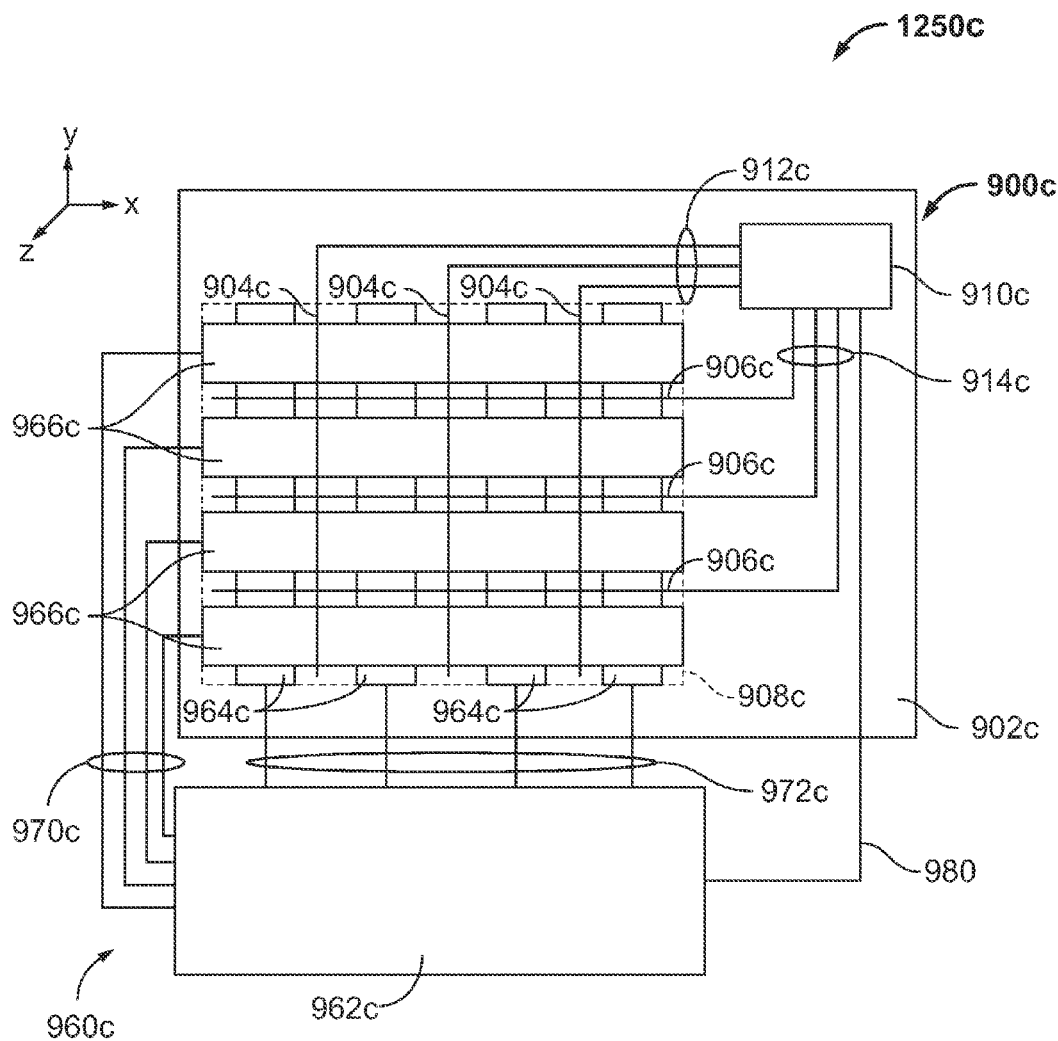
FIG. 12A shows an example of a touch sensing display device having adaptive sensing and/or adaptive addressing architecture.

FIG. 12A shows an example of a touch sensing display device having adaptive sensing and/or adaptive addressing architecture. The touch sensing display device 1250c of FIG. 12 is similar to the touch sensing display device 950c of FIG. 9C. However, the addressing circuit 962c and the sensing circuit 910c can be in communication with one another, for example, via a connection 980. In some implementations, the addressing circuit 962c can accept inputs from the sensing circuit 910c and/or the sensing circuit 910c can accept inputs from the addressing circuit 962c.

In some implementations, the sensing circuit 910c can adjust a sensing characteristic of the sensing device 900c based at least in part on an input received from the addressing circuit 962. In some implementations, an adjustment of a sensing characteristic by the sensing circuit 910c can be based on an electrical interference characteristic that is altered by the adjustment of an addressing characteristic by the addressing circuit 962c. As discussed below with reference to FIGS. 12B and 12C, the adjustment of a sensing characteristic by the sensing circuit 910c can be based on one or more lookup tables. For example, the addressing circuit 962c may increase an addressing characteristic such as resolution which can increase electrical interference produced by the display. The sensing circuit 910c can receive input from the addressing circuit relating to the adjustment of the addressing characteristic and/or to the increase in electrical interference and can adjust a sensing characteristic accordingly. Therefore, the sensing circuit 910c can adjust a sensing characteristic in response to a change in electrical interference based at least in part on an adjustment of an addressing characteristic. In some implementations, the sensing circuit 910c can sense a change in electrical interference and adjust a sensing characteristic based at least in part on the sensed change.

In some implementations, the addressing circuit 962c can adjust an addressing characteristic of the display device 960c based at least in part on an input received from the sensing circuit 910c. In some implementations, an adjustment of an addressing characteristic by the addressing circuit 962c can be based on a touch input that is provided to the addressing circuit 962c by the sensing circuit 910c. In one example, a touch input corresponding to an area of the sensor region 908c can be provided to the addressing circuit 962c such that only display rows 966c and display columns 964c that correspond to that area of the sensor region 908c are addressed while other portions of the display are not addressed. In this way, the addressing circuit 962c can limit power dissipation and electrical interference production by the display device 960c based at least in part on an input received from the sensing circuit 910c.

In some implementations, the touch sensing display device 1250c can include both adaptive sensing architecture and adaptive addressing architecture. In some such implementations, a sensing circuit can detect the location of a touch input and provide the location to an addressing circuit. The addressing circuit may change an addressing characteristic of a display based at least in part on the touch input. For example, the addressing circuit may adjust an addressing characteristic, for example, a partial update, of the display such that a cursor element is displayed underneath the touch input while the remainder of the display includes a static image. The sensing circuit may receive information identifying the adjusted addressing characteristic and/or identifying a change in interference caused by the addressing characteristic. The sensing circuit may adjust a sensing characteristic based at least partially on the received information. In some implementations, the sensing circuit may adjust the portions of the display that are scanned in response to the adjusted addressing characteristic and/or in response to the electrical interference characteristics of the display. For example, when the addressing circuit displays a cursor element, the sensing circuit may partially scan only a region of the display that includes the cursor element and/or increase a scan rate of a region of the display that includes the cursor element.

FIGS. 12B and 12C show examples of lookup tables that may be used in the touch sensing display device of FIG. 12A. FIG. 12B shows an example of a lookup table 1280b that includes an addressing characteristic input column 1282b and a sensing characteristic output column 1284b. The addressing characteristic input column 1282b can include various addressing characteristics that can be adjusted by an addressing circuit and provided to a sensing circuit. For clarity, the addressing characteristics included in the addressing characteristic input column 1282b are identified by numbers where each number corresponds to an addressing characteristic, for example, a partial update, update speed, identifying an addressing region, high voltage addressing, low voltage addressing, high segment drive, low segment drive, line inversion, dot inversion, frame inversion, and resolution. In some implementations, each addressing characteristic included in addressing characteristic input column 1282b can be of the same type. For example, each addressing characteristic in addressing characteristic input column 1282b can be a resolution of a portion of the display. In some implementations, the addressing characteristics included in addressing characteristic input column 1282b can include different types of addressing characteristics. Each of these addressing characteristics can optionally be altered by an addressing circuit when addressing a display and can result in a change in interference produced by the display.

The sensing characteristic output column 1284b can include various sensing characteristics that correspond to one or more addressing characteristics in the addressing characteristic input column 1282b. As an example, the sensing characteristics included in the sensing characteristic input column 1284b are identified as partial scan characteristics. However, the sensing characteristics included in the sensing input column 1284b can be of different types, for example, partial scan characteristics and frequency. Additionally, in some implementations, multiple sensing characteristics can correspond to a single addressing characteristic input in the addressing characteristic input column 1282b. Accordingly, a sensing circuit can adjust different types of sensing characteristics and/or multiple sensing characteristics based on one or more addressing characteristic input received from an addressing circuit.

FIG. 12C shows an example of a lookup table 1280c that includes an interference characteristic input column 1283c and a sensing characteristic output column 1284c. The interference characteristic input column 1283c can include various interference characteristics (e.g., electrical interference characteristics) that can be affected by an addressing circuit and provided to a sensing circuit. For clarity, the interference characteristics included in the interference characteristic input column 1283c are identified by numbers where each number corresponds to an interference characteristic. In some implementations, interference can increase in moving down the interference characteristic input column 1283c. Each of these interference characteristics can optionally be affected by an addressing circuit when addressing a display and can affect the performance of a touch sensor device by altering the local electrostatic field near one or more sensing elements.

The sensing characteristic output column 1284c can include various sensing characteristics that correspond to one or more interference characteristics in the interference characteristic input column 1283c. As an example, the sensing characteristics included in the sensing characteristic input column 1284c are identified as frequencies or sample rates. However, the sensing characteristics included in the sensing input column 1284c can be of different types, for example, partial scan characteristics and frequency. Additionally, in some implementations, multiple sensing characteristics can correspond to a single addressing characteristic input in the interference characteristic input column 1283c. Accordingly, a sensing circuit can adjust different types of sensing characteristics and/or multiple sensing characteristics based on an interference characteristic input.

The lookup tables 1280b, 1280c can be programmed to include pre-set inputs and outputs and/or can be programmable by a user input to change the inputs and outputs. The lookup tables 1280b, 1280c can be stored in one or more storage devices coupled to the addressing circuit. Alternatively, the addressing circuit may be hardwired to the values set forth in the lookup tables 1280b, 1280c. In operation, an addressing circuit may address a display according to one or more addressing characteristics. The addressing characteristic(s) used to address a display at a given time can result in interference which can affect sensing performance. Thus, addressing characteristic(s) and/or interference characteristic(s) can be received by a sensing circuit. The sensing circuit can optionally adjust a sensing characteristic based at least in part on a received addressing characteristic and/or interference characteristic as set-forth in a lookup table, for example, lookup tables 1280b, 1280c of FIGS. 12B and 12C. The lookup tables 1280b, 1280c can be stored in one or more storage devices coupled to the sensing circuit. Alternatively, the sensing circuit may be hardwired to the values set forth in the lookup tables 1280b, 1280c. In some implementations, the sensing circuit can adjust a sensing characteristic based on an addressing characteristic input lookup table (e.g., table 1280b). In some implementations, the sensing circuit can adjust a sensing characteristic based on an interference characteristic input lookup table (e.g., table 1280c). In some implementations, the sensing circuit can adjust a sensing characteristic based on an interference characteristic input lookup table and an addressing characteristic input lookup table. In this way, the adjustment of the sensing characteristic by a sensing circuit can be determined by one or more lookup tables.

Figure 13:
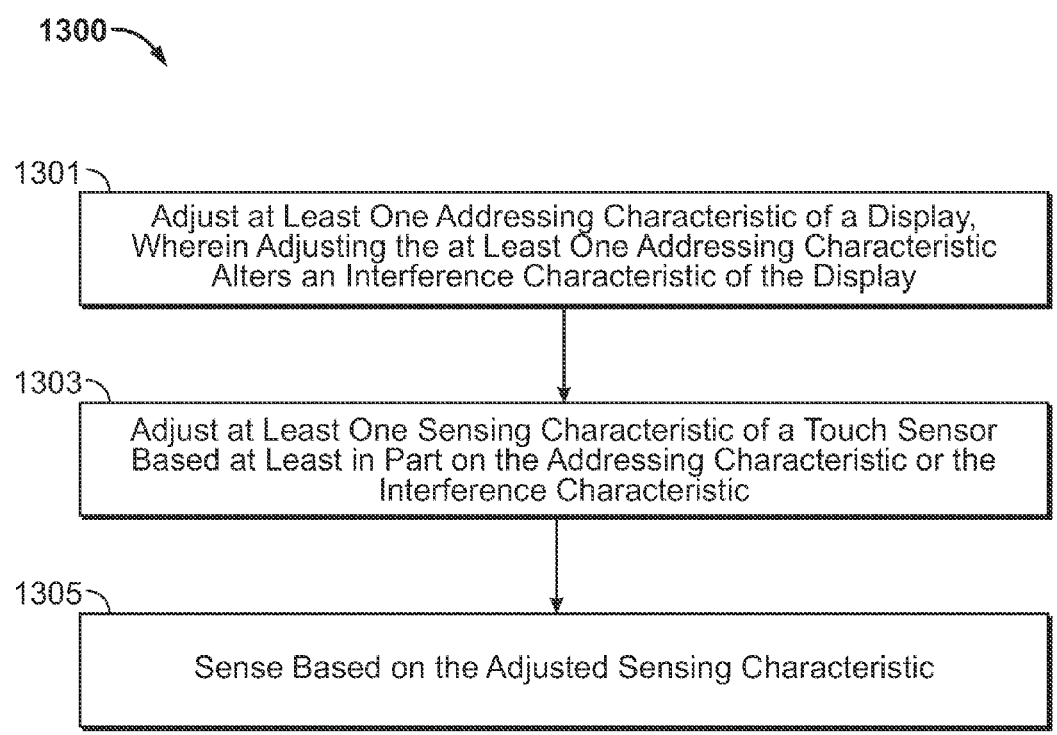
FIG. 13 shows an example of a process for use with a touch sensing display device.

FIG. 13 shows an example of a process for use with a touch sensing display device. As shown in block 1301, the example process 1300 can include adjusting at least one addressing characteristic of a display, wherein adjusting the at least one addressing characteristic alters an interference characteristic of the display. The addressing characteristic that is adjusted can include, for example, identifying an addressing region or an update speed.

As shown in block 1303, the example process 1300 can include adjusting at least one sensing characteristic of a touch sensor based at least in part on the addressing characteristic or the interference characteristic. In some implementations, the sensing characteristic that is adjusted can include, for example, signal-to-noise ratio, sensitivity threshold, start/stop times, partial scans, voltage of the input waveform to the sensing circuit, current drive of the sensing waveform, frequency, and the type and/or amount of filtering applied to the received sensing signal. In some implementations, adjusting the at least one addressing characteristic can decrease the interference characteristic and adjusting the sensing characteristic can increase the sensing characteristic. In some implementations, adjusting the at least one addressing characteristic can increase the interference characteristic and adjusting the sensing characteristic can decrease the sensing characteristic. The example process 1300 can also include sensing based on the adjusted sensing characteristic as shown in block 1305.

Figure 14A:
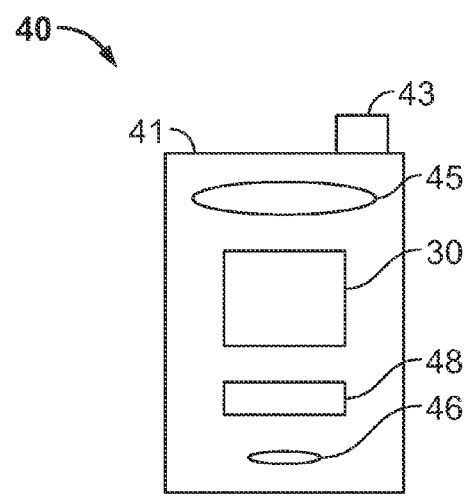
FIGS. 14A and 14B show examples of system block diagrams illustrating a display device that includes a plurality of interferometric modulators.
Figure 14B:
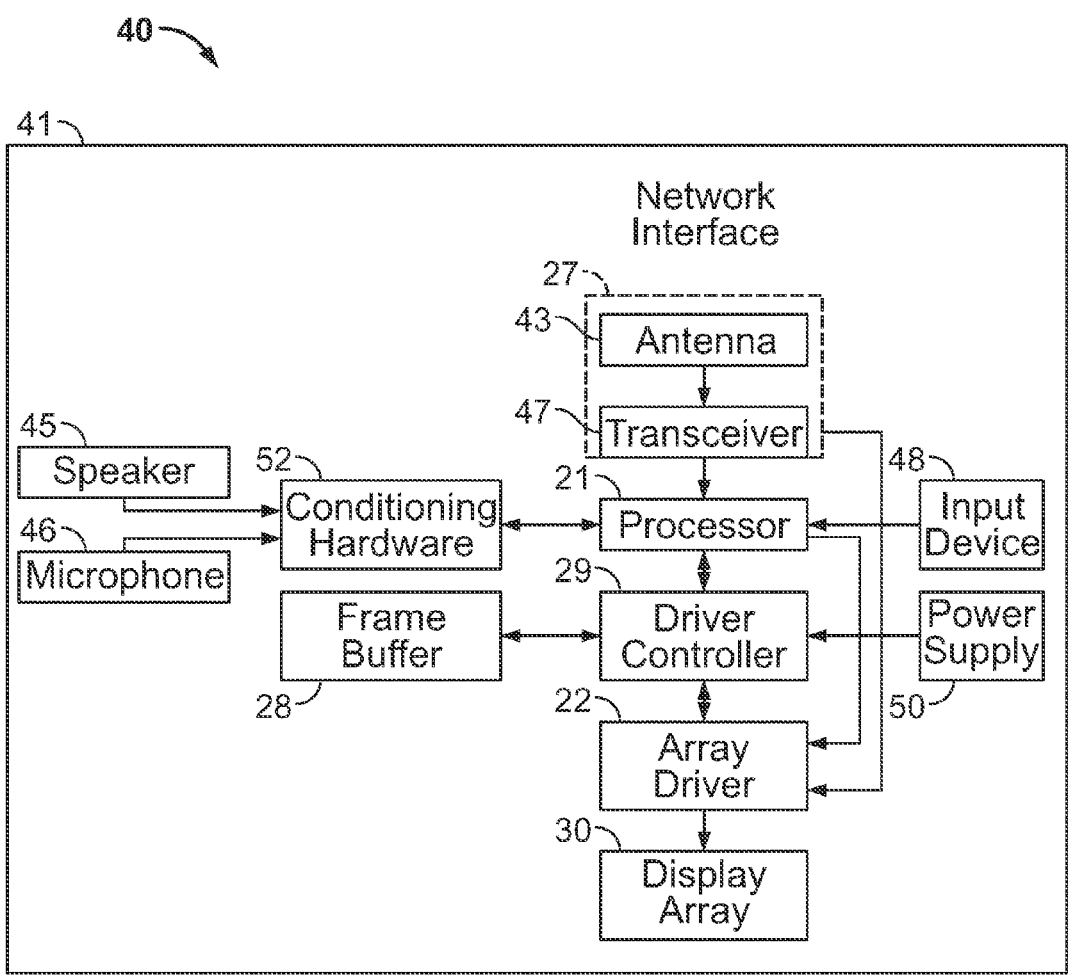

FIGS. 14A and 14B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 14B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A touch sensing display device comprising:
 a touch sensor;
 a display device disposed underneath at least a portion of the touch sensor;
 an addressing circuit capable of addressing a plurality of display rows of the display device according to at least one addressing characteristic of the display device, wherein the addressing causes a change in an interference characteristic of the display device; and
 a sensing circuit capable of adjusting at least one sensing characteristic of the touch sensor based at least in part on the change in the interference characteristic, wherein the at least one sensing characteristic includes a sampling rate or a sensitivity threshold.

2. The touch sensing display device of claim 1, wherein the sensing circuit is capable of sensing based on the at least one addressing characteristic or the interference characteristic.

3. The touch sensing display device of claim 1, wherein the addressing causes the interference characteristic to increase.

4. The touch sensing display device of claim 3, wherein the sensing circuit is configured to decrease the at least one sensing characteristic.

5. The touch sensing display device of claim 1, wherein the addressing causes the interference characteristic to decrease.

6. The touch sensing display device of claim 5, wherein the sensing circuit is configured to increase the at least one sensing characteristic.

7. The touch sensing display device of claim 1, wherein the at least one sensing characteristic includes a signal-to-noise ratio.

8. The touch sensing display device of claim 1, wherein the addressing characteristic includes information identifying an addressing region.

9. The touch sensing display device of claim 1, wherein the addressing characteristic includes an update speed.

10. The touch sensing display device of claim 1, wherein the display device includes an interferometric modulator.

11. The touch sensing display device of claim 1, further comprising a lookup table stored in one or more storage devices coupled to the sensing circuit, wherein the lookup table includes the at least one addressing characteristic and the at least one sensing characteristic.

12. The touch sensing display device of claim 1, further comprising:
a processor that is capable of communicating with the display device, the processor being capable of processing image data; and
a memory device that is capable of communicating with the processor.

13. The touch sensing display device of claim 12, further comprising: a driver circuit configured to send at least one signal to the display device.

14. The touch sensing display device of claim 13, further comprising a controller capable of sending at least a portion of the image data to the driver circuit.

15. The touch sensing display device of claim 12, further comprising an input device capable of receiving input data and to communicate the input data to the processor.

16. The touch sensing display device of claim 15, wherein the input device comprises a touch sensor.

17. The touch sensing display device of claim 12, further comprising an image source module capable of sending the image data to the processor.

18. The touch sensing display device of claim 17, wherein the image source module comprises at least one of a receiver, transceiver, and transmitter.

19. A touch sensing display device comprising:
means for sensing a touch input;
means for displaying information disposed underneath at least a portion of the sensing means;
means for addressing the means for displaying information;
means for adjusting at least one addressing characteristic of the means for displaying information, wherein adjusting the at least one addressing characteristic alters an interference characteristic of the means for displaying information; and
means for adjusting at least one sensing characteristic of the sensing means based at least in part, on at least one of the addressing characteristic and the interference characteristic.

20. The device of claim 19, wherein the addressing means includes an addressing circuit.

21. The display device of claim 19, wherein the sensing means includes a sensing circuit.

22. The display device of claim 19, wherein the sensing means is capable of sensing based on the adjusted sensing characteristic.

23. The display device of claim 19, wherein the addressing means is capable of adjusting the at least one addressing characteristic such that the interference characteristic increases.

24. The display device of claim 23, wherein the sensing means is capable of decreasing the at least one sensing characteristic.

25. The display device of claim 19, wherein the addressing means is capable of adjusting the at least one addressing characteristic such that the interference characteristic decreases.

26. The display device of claim 25, wherein the sensing means is capable of increasing the at least one sensing characteristic.

27. A method comprising:
adjusting at least one addressing characteristic of a display, wherein the display is disposed underneath at least a portion of a touch sensor, wherein adjusting the at least one addressing characteristic alters an interference characteristic of the display;
adjusting at least one sensing characteristic of the touch sensor based, at least in part, on the addressing characteristic or the interference characteristic; and
sensing based on the adjusted sensing characteristic.

28. The method of claim 27, wherein adjusting the at least one addressing characteristic increases the interference characteristic.

29. The method of claim 28, wherein the at least one sensing characteristic is decreased.

30. The method of claim 27, wherein adjusting the at least one addressing characteristic decreases the interference characteristic.

31. The method of claim 30, wherein the at least one sensing characteristic is increased.

* * * * *